United States Patent [19]

Marcias-Garza

[11] Patent Number: 5,283,880
[45] Date of Patent: Feb. 1, 1994

[54] METHOD OF FAST BUFFER COPYING BY UTILIZING A CACHE MEMORY TO ACCEPT A PAGE OF SOURCE BUFFER CONTENTS AND THEN SUPPLYING THESE CONTENTS TO A TARGET BUFFER WITHOUT CAUSING UNNECESSARY WAIT STATES

[75] Inventor: Fernando Marcias-Garza, Puebla, Mexico

[73] Assignee: Compaq Computer Corp., Houston, Tex.

[21] Appl. No.: 636,732

[22] Filed: Jan. 2, 1991

[51] Int. Cl.$^5$ ............................................. G06F 12/00
[52] U.S. Cl. ................................ 395/425; 395/400; 364/DIG. 1; 364/238.4; 364/243.41; 364/957.1
[58] Field of Search ... 364/200 MS File, 900 MS File; 395/425, 400

[56] References Cited

U.S. PATENT DOCUMENTS

| | | | |
|---|---|---|---|
| 3,806,888 | 4/1974 | Brickman et al. | 340/172.5 |
| 4,847,758 | 7/1989 | Olson et al. | 395/425 |
| 4,860,192 | 8/1989 | Sachs et al. | 395/400 |
| 4,872,138 | 10/1989 | Ciacci | 364/200 |
| 4,899,275 | 2/1990 | Sachs et al. | 395/425 |
| 5,027,270 | 6/1991 | Riordan et al. | 395/425 |
| 5,034,917 | 7/1991 | Bland et al. | 395/425 |

FOREIGN PATENT DOCUMENTS 0303752 8/1987 European Pat. Off. .

OTHER PUBLICATIONS

15th Annual International Symposium On Computer Architecture, Conf. Proceedings, May 30, 1988, Honolulu, US pp. 410–421, XP44826 Cheriton et al. "The VMP Multiprocessor: Initial Experience, Refinements and Performance Evaluation" p. 412, right column, line 36—p. 413, right column, line 44.
IBM Technical Disclosure Bulletin vol. 19, No. 1, Jun. 1976, New York US pp. 67–70 Dvorak et al. "Hardware Assist for Microcode Execution of Storage-to-Storage Move Instructions" the whole document.
Intel Microprocessor and Peripheral Handbook, vol. 1, Intel, pp. 4–9 Thru 4–11 (1988).

Primary Examiner—Joseph L. Dixon
Assistant Examiner—Frank J. Asta
Attorney, Agent, or Firm—Pravel, Hewitt, Kimball & Krieger

[57] ABSTRACT

A method for performing buffer copy operations in a personal computer system utilizing paged memory mode architecture and having a cache memory. The contents of a first buffer are read into a microprocessor register and simultaneously written into a cache memory. The first buffer is then read again and written to a second buffer, with the actual data values being obtained from the cache memory. This method avoids excessive wait states associated with changing memory pages from the first buffer memory address to the second buffer memory address for each data value.

7 Claims, 6 Drawing Sheets

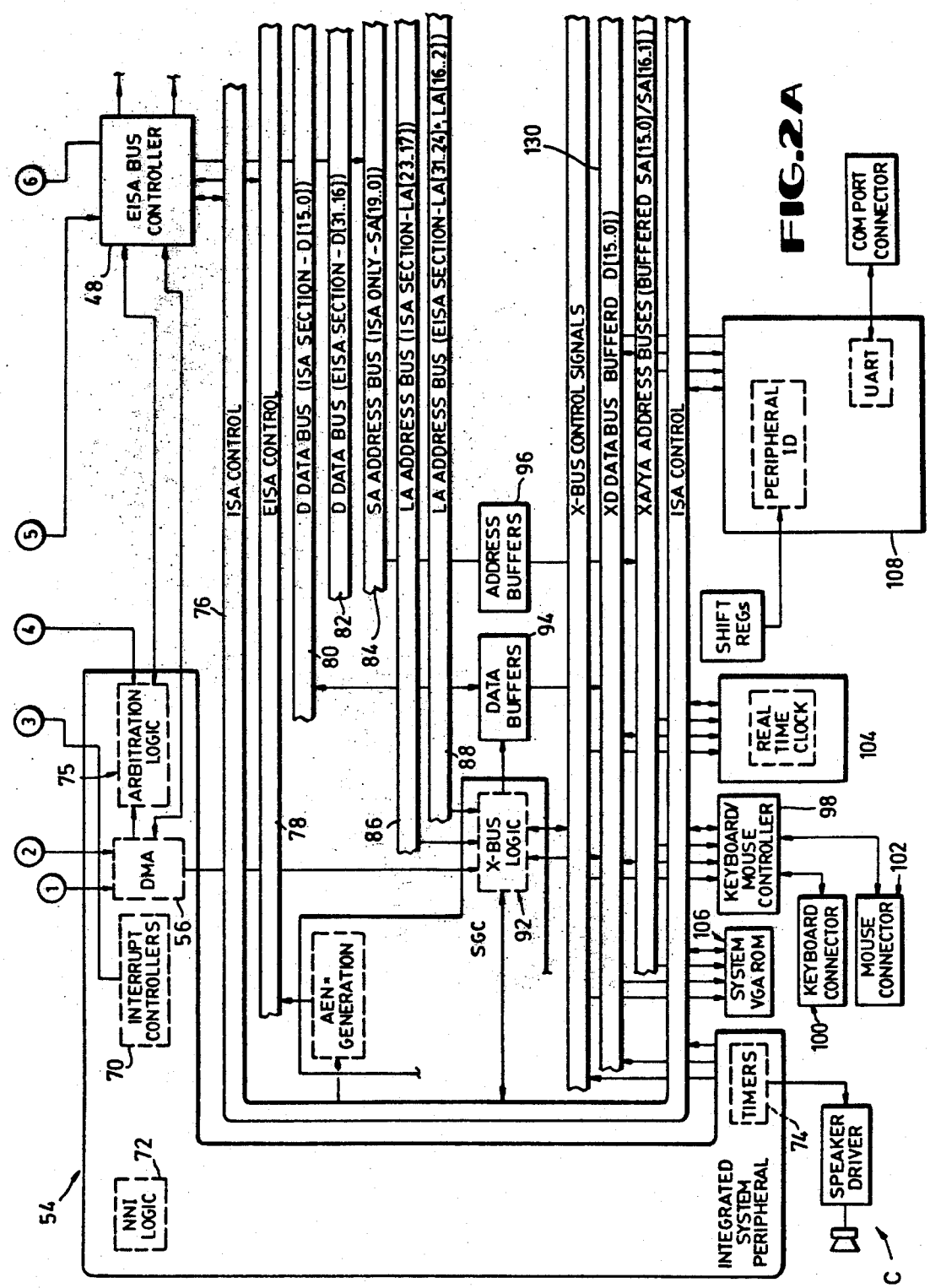

BLOCK TIMING OF TABLE 1A, LINES 01-04

BLOCK TIMING OF TABLE 1B, LINES 01-09

METHOD OF FAST BUFFER COPYING BY UTILIZING A CACHE MEMORY TO ACCEPT A PAGE OF SOURCE BUFFER CONTENTS AND THEN SUPPLYING THESE CONTENTS TO A TARGET BUFFER WITHOUT CAUSING UNNECESSARY WAIT STATES

BACKGROUND OF THE INVENTION

1. Field of the Invention

The present invention is related to the field of memory management for personal computers, in particular to a method for performing a fast buffer copy in a personal computer utilizing a paged mode memory architecture and having a cache memory.

2. Description of the Related Art

Personal computer systems are becoming increasingly more powerful, now achieving processing performance levels previously only within the range of minicomputers. Device manufacturers have developed faster and more powerful microprocessors which are rapidly entering the personal computer market. Examples of such microprocessors include Intel Corporation's (Intel) 80386 and 80486 microprocessors. As microprocessors have become increasingly faster, the speed of memory devices is also a major factor in determining the speed that an application will run. While fast memory devices are available, their use in main memory in a computer system is not common due to their high cost.

An alternative to the general use of high speed memory as main memory is to utilize a cache memory system. In a cache memory system, a small amount of fast memory is used as a temporary storage area and slower, more cost effective, memory devices are used in the computer system's main memory. Data contained in portions of the main memory is duplicated in the fast cache memory. An operation requiring data which is stored in the cache memory will be performed at a higher speed than operations which access normal memory. A cache controller is used to determine if the desired information is contained within the cache memory and to control the data transfer from the cache memory. Techniques for the management of cache memory are generally known within the industry. For example, Intel used the cache memory concept when developing the 80386 microprocessor family of devices, including an 82385 cache controller. For detailed information on these devices, please refer to the 1989 Intel Microprocessor and Peripheral Handbook, Volume 1. The use of a cache system generally assures that a copy of the cacheable memory data last read or written by the main processor is maintained in the cache. The amount of information which may be stored in the cache is a function of cache size. There exist a number of algorithms for determining what information will remain in the cache memory. One algorithm is the Least Recently Used (LRU) technique wherein information LRU'd in cache memory is displaced by the next cache miss operation.

Another means of improving speed of memory devices is the use of paged mode dynamic random access memories (DRAM's). A page mode DRAM device may be used in any type of computer system architecture for speeding up main memory access using cheaper RAM. Memory is accessed in a paged memory device by the microprocessor issuing an address for a particular location in the memory array. The address is loaded into a memory controller. The memory controller handles the task of providing the row and column addresses used by a DRAM from the full address provided by the microprocessor. It will be appreciated that placing first the row and then the column address on the DRAM address bus and meeting the particular timing requirements of the DRAM requires a considerable amount of time. The paging technique is used to decrease the amount of time required to access a particular memory address. In a computer system using paged memory DRAM devices, the microprocessor issues a full address to access a specific memory address within a DRAM device as before. However, the memory controller now includes a previous address latch and a comparator to determine if the DRAM row address has changed between successive memory requests. If so, a full row and column address cycle must be issued. However, if the row address has not changed so that the desired memory address is on the same page as the previous access, only a new column address need be provided. It will be appreciated that the time required to access the subsequent memory address is significantly less than that required if the memory controller must issue both a row address and column address and perform a full addressing cycle. If the memory operation is located on the same page, this is known as a page hit. If the row address must be changed because a different page is being requested, this is known as a page miss.

A common operation in computer system applications calls for data stored in a first buffer to be copied to a second buffer. Usually, the two buffers are located on different memory pages. When this situation occurs, the system performance may suffer during the buffer copy operation. For example, if each element of data is to be read from a source buffer located on page $P_i$ and to be written to a target buffer on page $P_j$ on an element-by-element basis, no read or write page hits will occur. The computer system memory controller will read an element from page $P_i$, write it to page $P_j$ and a page write miss will occur, requiring the issuance of a row and column address, as the memory controller will be required to change pages to perform the write. The memory controller will then read the next element from page $P_i$ and a page read miss will occur as the memory controller must index from page $P_j$ to page $P_i$. It will be appreciated that each read or write operation will create an associated page miss. These page misses dramatically increase the buffer copy time as compared to a case where page hits occur. Thus, there exists a need for a method to maximize the number of memory page hits during a buffer copy operation.

SUMMARY OF THE PRESENT INVENTION

The present invention is directed to a method for minimizing the time required to accomplish buffer copy operations in a personal computer utilizing a paged memory architecture and having a cache memory.

In a computer system utilizing cache memory, writes to the cache memory occur simultaneously with reads from the source buffer and are invisible to the memory controller. In the present invention, a request is issued to read and load the contents of the source buffer into a register in the microprocessor. As this data is loaded into the register, it is also written to the cache memory. Subsequent reads from the source buffer into the microprocessor register have the effect of overwriting the previous contents of the register. However, the successive read/loads are to different locations in the cache memory. Thus the buffer read request essentially fills the cache with the contents of the source buffer. The memory controller does not change pages during the read operations, so the memory controller continues to address the page on which the source buffer is located. In the event that the source buffer crosses a memory page boundary, there will be only one page miss, requiring a row and column address, at the page boundary and subsequent reads from memory will again occur as page hits requiring only column addresses. Thus, the reads are generally seen as a series of page hits.

Following the reading of data from the source buffer and loading of the contents of the source buffer into cache memory, a request is issued to copy the contents of the source buffer to the target buffer. However, because the cache memory is loaded with the contents of the source buffer, all reads which would normally be directed by the memory controller to the source buffer locations in main memory are intercepted by the cache controller and serviced from cache memory. Thus, the read requests are effectively masked from the memory controller. The memory controller only sees a series of write operations to the target buffer. Further, since the target buffer is generally located in a single page of memory, the writes will all be page hits. In the event the target buffer exceeds a single page or crosses a page boundary, there will be only one write page miss as the boundary is crossed and subsequent writes will again occur as page hits.

Thus, the present invention, by maximizing the number of memory page hits, minimizes the time required to perform buffer copy operations to less than that required to correctly copy a buffer from one location to a location on another page of memory. Further, by using the cache as a temporary storage space, the present invention does not require additional hardware dedicated to temporary storage.

BRIEF DESCRIPTION OF THE DRAWINGS

A better understanding of the present invention can be obtained when the following detailed description of the preferred embodiment is considered in conjunction with the following drawings, in which:

FIGS. 1, 2a and 2b are schematic block diagrams of a computer system having cache memory and a disk subsystem.

Detailed Description of the Preferred Embodiment

Figure 1:
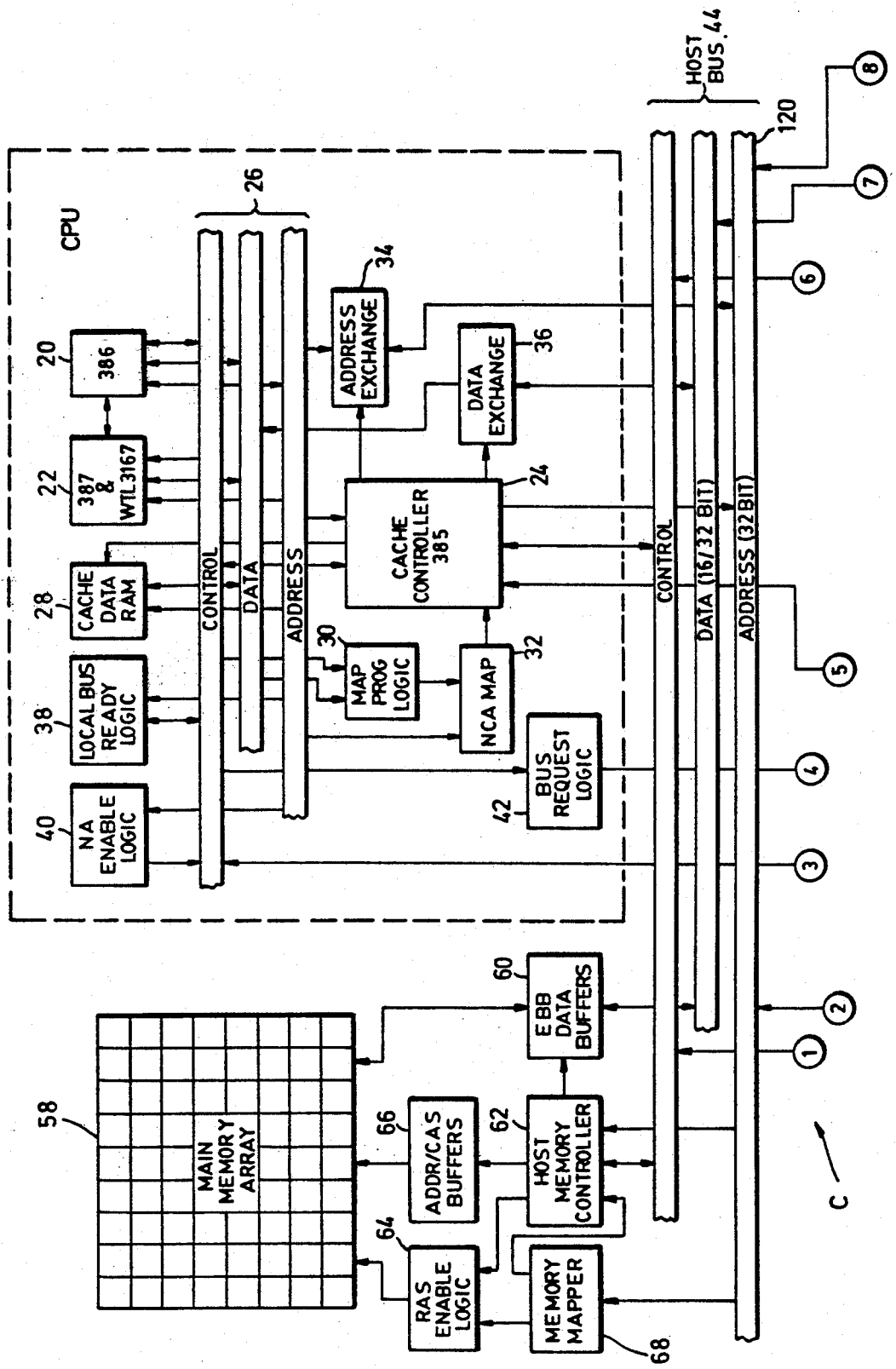
Figure 2B:
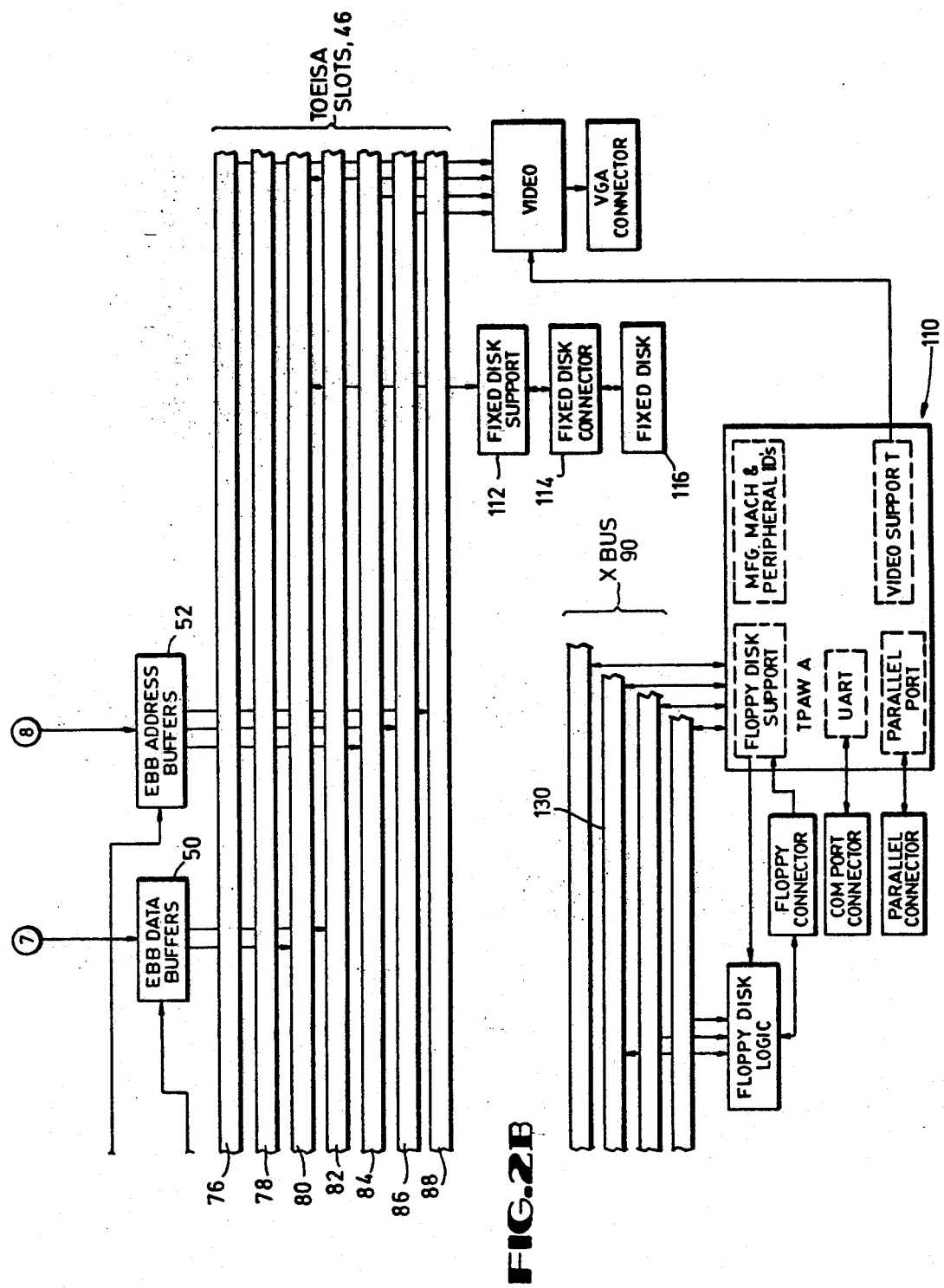

Referring now to FIGS. 1, 2A and 2B, the letter C designates generally a computer system incorporating the present invention. For clarity, system C is shown in two portions, with the interconnections between FIGS. 1, 2A and 2B designated by reference to the circled numbers one to eight. System C is comprised of a number of block elements interconnected via four buses. A central processing unit CPU comprises a processor 20, a numerical coprocessor 22 and a cache memory controller 24 and associated logic circuits connected to a local processor bus 26. Associated with cache controller 24 is high speed cache data random access memory (RAM) 28, noncacheable memory address map programming logic circuitry 30, noncacheable address memory 32, address exchange latch circuitry 34 and data exchange transceiver 36. Associated with the CPU are local bus ready logic circuit 38, next address enable logic circuit 40 and bus request logic circuit 42.

The processor 20 is preferably an Intel 80386, as illustrated, or 80486 microprocessor. The Intel 80486 microprocessor itself includes an 8 kbyte internal cache memory and numeric coprocessor, thus possibly eliminating the need for a separate numeric coprocessor 22 and the cache controller 24 and cache data RAM 28, unless an external cache is desired for performance reasons. Operation with an 80386 will be explained in this description, the differences between an 80386 and 80486 being readily discernable to one skilled in the art. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache RAM 28 is preferably suitable high-speed static RAM which interfaces with the address and data elements of bus 26 under control of the cache controller 24 to carry out required cache memory operations. The cache controller 24 is preferably an Intel 82385 cache controller configured to operate in two-way set associative master mode. The cache system preferably contains 64 kbytes of cache RAM 28 and a line size of 64 bits. In the preferred embodiment the components are the 33 MHz versions of the respective units. Address latch circuitry 34 and data transceiver 36 interface the cache controller 24 with the processor 20 and provide a local bus interface 30 between the local processor bus 26 and a host bus 44.

Circuit 38 is a logic circuit which provides a bus ready signal to control access to the local bus 26 and indicate when the next cycle can begin. The enable circuit 40 is utilized to indicate that the next address 35 of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required. A page hit detector 43 performs the successive address determinations to provide a signal indicating whether a page hit or miss condition is present. In the drawings, system C is configured having the processor bus 26, the host bus 44, an extended industry standard architecture (EISA) bus 46 (FIG. 2) and an X bus 90. The details of the portion of the system illustrated in FIGS. 2A and 2B and not discussed in detail below are not significant to the present invention other than to illustrate an example of a fully configured computer system.

The portion of system C illustrated in FIGS. 2A and 2B essentially a configured EISA system which includes the necessary EISA bus 46, and EISA bus controller 48, data latches and transceivers 50 and address latches and buffers 52 to interface between the EISA bus 46 and the host bus 44. Also illustrated in FIG. 2A is an integrated system peripheral 54 (ISP), which incorporates a number of the elements used in an EISA-based computer system. The ISP 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt request are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46. The main memory array 58 is preferably dynamic random access memory. Memory 58 interfaces with the host bus 44 via a data buffer circuit 60, a memory controller circuit 62 and a memory mapper 68. The buffer 60 performs data transceiving and parity generating and checking functions. The memory controller 62 and memory mapper 68 interface with the memory 58 via address multiplexer and column address strobe buffers 66 and row address enable logic circuit 64. The memory controller 62 receives the page hit signal from the page hit detector 43 to determine if both row and column addresses must be provided or if only column addresses are necessary.

The EISA bus 46 includes ISA and EISA control buses 76 and 78, ISA and EISA control buses 80 and 82 and address buses 84, 86 and 88 (FIG. 2B). System peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory (ROM) circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

FIGS. 1, 2A and 2B describe an exemplary personal computer system utilizing paged memory devices in RAM 58 and having a cache memory 28. The present invention is a method for buffer copy operations on such a system. It is understood that the method of the present invention is not limited to the computer system described in FIGS. 1, 2A and 2B but may be utilized on any computer having paged memory devices and cache memory.

Figure 4:
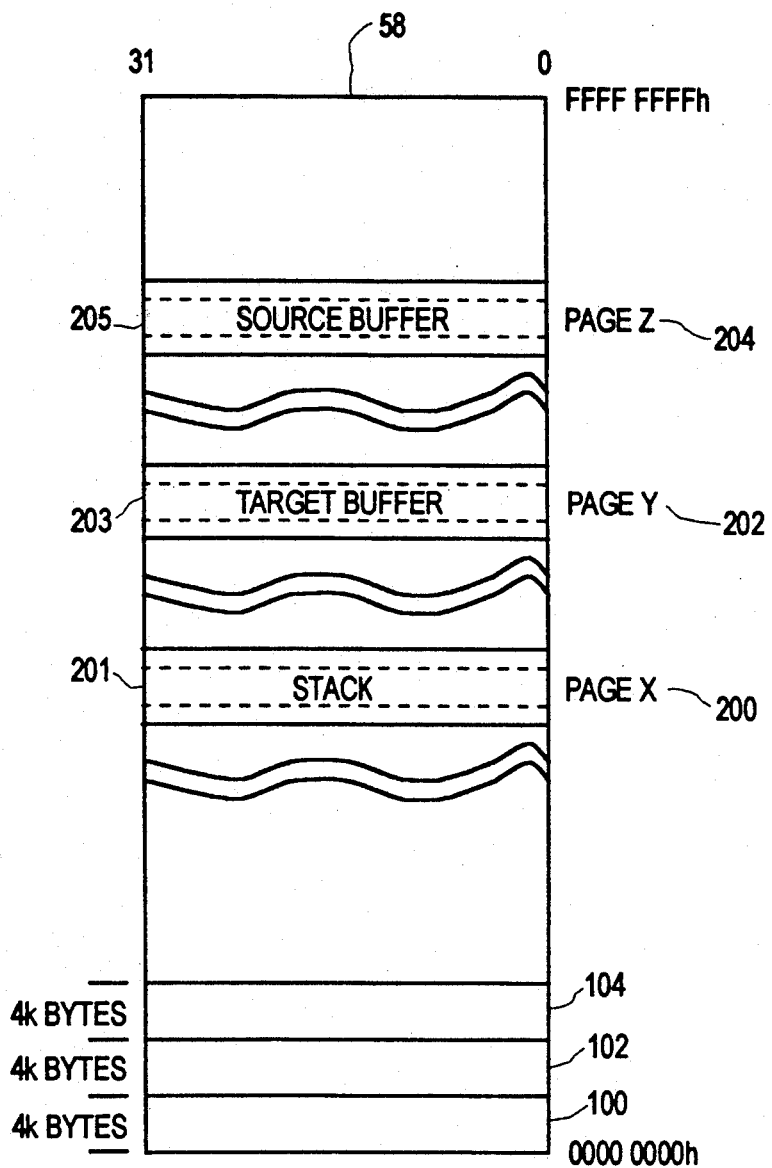
FIG. 4 is an exemplary diagram of a computer system memory address map showing placement of the source and target buffers, command stack and memory location.

FIG. 4 is an exemplary memory address map for the main memory array 58 of the computer described in FIGS. 1 and 2. The address map of FIG. 4 depicts a memory address range from 0000 0000–FFFF FFFFh, where h denotes hexadecimal notation. When utilizing paged mode, the Intel 80386 architecture breaks the memory address range into uniform 4 kbyte pages, including pages 100, 102 and 104, and pages X 200, Y 202 and Z 204. See, Intel 1989 Microprocessor and Periohperal Handbook, Vol. 1 at p. 4–47 ("the Intel manual"). In exemplary FIG. 4, the source buffer 205 is located on page Z 204, the target buffer 203 is located on page Y 202, and the stack 201 is located on page X 200. It will e appreciated that the location of pages X 200, Y 202, Z 204 relative to each other is arbitrary and generally a function of the particular operating system, the applications running at the time and the manner in which memory has been allocated on the computer C. Likewise, the placement of the source and target buffers, as well as the stack, within a page is dependent on the above factors.

TABLE 1A

| Line | |
|---|---|
| 0a | buff_size equ 1024*10 |
| 0b | sourcebuff dw buff_size dup |
| 0c | destbuff dw buff_size dup |
| 0d | stack db 1024 dup |
| /** prep segment registers **/ | |
| 0e | mov ax, @data |
| 0f | mov ds, ax |
| 0g | mov es, ax |
| 0h | mov ss, ax |
| 0i | mov ax, offset stack |
| 0j | mov sp, ax |
| /** buffer copy **/ | |
| 01 | mov si, offset sourcebuff |
| 02 | mov di, offset destbuff |
| 03 | mov cx, buff_size/4 |
| 04 | rep movsd |

TABLE 1B

| Line | |
|---|---|
| 0a | buff_size equ 1024*10 |
| 0b | sourebuff dw buff_size |
| 0c | destbuff dw buff_size |
| 0d | stack db 1024 dup |
| /** prep segment registers **/ | |
| 0e | mov ax, @data |
| 0f | mov ds, ax |
| 0g | mov es, ax |
| 0h | mov ss, ax |
| 0i | mov ax, offset stack |
| 0j | mov sp, ax |
| /** buffer copy **/ | |
| 01 | mov si, offset sourcebuff |
| 02 | mov di, offset destbuff |
| 03 | mov cx, buff_size/4 |
| 04 | push si |
| 05 | push cx |
| 06 | rep lodsd |
| 07 | pop cx |
| 08 | pop si |
| 09 | rep movsd |

Table 1A is an 80386 assembler code listing setting forth the normal method utilized in buffer copy operations. Table 1B is an 80386 assembler code listing setting forth the method of the present invention and represents the best mode known to the inventors. The assembly language code shown in Tables 1A and 1B includes instructions which have been defined for the 80386 and 80486 microprocessors and are further described in the Intel microprocessor manual and other publications describing the operation and language of the microprocessors. As may be seen in Tables 1A and 1B, there are several preparatory operations which must be carried out prior to actual buffer copy operations. First, the buffer sizes must be defined (lines 0a-0d). This is common to both methods. The memory pages on which the buffers and stack are located may be contiguous. However, it is more likely that they are non-contiguous and in separated locations, as depicted in FIG. 4. As noted in the discussion of FIG. 4, the actual location of the source and target buffers and stack is arbitrary and generally a function of the operating system, the application being run and memory allocation of the computer on which the claimed method is being performed. This separate page location is assumed in this description unless otherwise noted.

Second, the segment registers (which are described more fully in the Intel microprocessor manual) are set to carry out copy operations (lines 0e-0j). Again, these steps are common to both the normal method of buffer copying and the method of the present invention.

In the normal method for buffer copying (Table 1A), source and destination pointers are set to the buffer to be copied (the source buffer, $B_s$) and the buffer to which the information is to be copied (the target or destination buffer, $B_t$) (Table 1A, lines 01-2). The number of individual transfers must also be determined (Table 1A, line 03). The computer system described in FIGS. 1 and 2 contemplates the use of 32 bit width transfers (4 bytes). Thus, the number of transfers which take place is equal the BUFF_SIZE, in bytes, divided by four. The nor method then proceeds to copy the information for the source buffer $B_s$ to the target buffer as a series of reads from the source buffer and writes to the target buffer as performed by the REP MOVSD instruction (Table 1A, line 04).

It is a common occurrence that the memory address for the source buffer $B_s$ does not appear on the same memory page as the target buffer $B_t$. The first read operation requires the memory controller 62 to read from the source buffer $B_s$ on a particular memory page. The memory controller 62 must then write the contents of the transfer to the target buffer $B_t$. If the target buffer $B_t$ address is on a different memory page, the computer must wait until the memory controller 62 provides a full address, comprising new row and column addresses which reference the new memory page, to write the contents of the transfer. This is known as a write page miss to indicate that the memory controller 62 was forced to change memory pages to complete the write operation. The routine will then attempt to read the next four bytes to be transferred. However, the memory controller 62 is now addressing the target buffer $B_t$ and must again provide a full address in order to access the memory page on which the source buffer $B_s$ address is located, incurring a wait penalty for the operation of the memory controller 62. This is known as a read page miss. The normal method then proceeds to read and write the contents of the source buffer $B_s$, including a write page miss and read page miss for each the source buffer $B_s$ has been copied to the target buffer $B_t$.

The method of the present invention is set forth in Table 1B. As may be readily seen, the preliminary steps required in the method of the present invention are identical to those of the normal buffer copy method (Table 1A, lines 0a-03 are identical to Table 1B, lines 0a-03). The method of the present invention then saves the source buffer $B_s$ address and the number of transfers to be performed by pushing the information onto the stack (Table 1B, lines 04-05). The buffer transfer operation begins by loading the contents of the entire source buffer $B_s$ into a single register in the microprocessor 20 (Table 1B, line 06). Each succeeding double word loaded into the register overwrites the previous double word. This is acceptable because as the information is loaded into the register, it is also being written into the cache memory 28 without overwriting the cache contents. The process continues until the entire contents of the source buffer $B_s$ are loaded into the cache memory 28. The loading of the source buffer contents into cache memory 28 is performed simultaneously with loading the contents into the microprocessor 20 register. Thus, after this process is completed, the cache memory 28 contains a copy of the entire source buffer.

Unlike the normal method, the present method does not attempt to immediately write each element to the target buffer $B_t$ upon reading the element. The present method performs this block read without attempting to write to the target buffer $B_t$. As the source buffer $B_s$ is generally located on a single page of memory 58, the register and cache memory 28 is seen by the computer system as a series of read page hits, has the memory controller 62 does not need to change memory 58 pages because the write operation of the register does not affect the memory 58 devices and so not seen by the page hit detector 43, the memory co 62 or the memory 58 devices themselves. When source buffer $B_s$ is located on more than one page of memory 58, a read page miss Will occur when the memory controller 62 changes pages. However, subsequent roads will occur as read page hits. Thus, the entire cache loading can be completed in a very short time because the extended delays resulting in read page misses accompanying the transfer of each element in the normal buffer copy method do not occur.

In the present method, the LODSD instruction is used to perform a memory to register data transfer while simultaneously loading the contents of the source buffer $B_s$ into cache memory 28. Computer systems based on microprocessors other than an Intel 80386 or 80486 may not have a similar memory to register transfer instruction as part of their instruction set. An alternate method of loading the source buffer $B_s$ contents into cache memory 28 would utilize a memory to memory data transfer instruction, such as a MOVSD. It is recognized that a memory to memory transfer would increase the time required to perform the present method. However, the time required could be minimized by instructing the microprocessor 20 to read the source buffer $B_s$ and write the contents back to the very same address location in the source buffer $B_s$. Thus, the memory controller 62 would perform the reads and writes as a series of page hit reads and page hit writes while loading the contents of the source buffer $B_s$ into the cache memory 28. The use of source buffer to source buffer read and write to avoid page misses may be utilized within the method of the present invention without any substantive changes to the remainder of the method. However, the use of a memory to register transfer as set forth in Table 1B, line 06 is the preferred method for this embodiment.

The present method then retrieves the location of the source buffer $B_s$ address and the number of transfers from the stack (Table 1B, lines 07-08). The present method then instructs the computer system to copy the contents of the source buffer $B_s$ to the target buffer $B_t$, as in the normal method (Table 1B, line 09). However, when the computer system begins read operations from the source buffer $B_s$, the cache controller 24 will actually perform the read operation since the information has already been loaded into the cache memory 28. The memory controller 62 will not access main memory 58 as the read operation takes place directly from the high speed cache memory 28. Because the source information is being read directly from cache memory 28, the memory controller 62 need not access the page on which the source buffer $B_s$ is located and the reads from cache memory 28 will be invisible to the memory controller 62. The data is then written to the target buffer $B_t$. The write operations will be the only operations accessing main memory 58 and so the operations will occur as a series of page write hits, unless a page boundary is crossed, at which time one full write access will occur because of the page miss, but the remaining operations will occur as write page hits.

The MOVE operation is thus seen by the memory controller 62 as a series of page write hits to the target buffer $B_t$. This cycle repeats until the entire contents has been transferred. Thus, the present invention avoids the series of alternating page read and page write misses associated with the normal method of buffer copying.

Figure 3A:
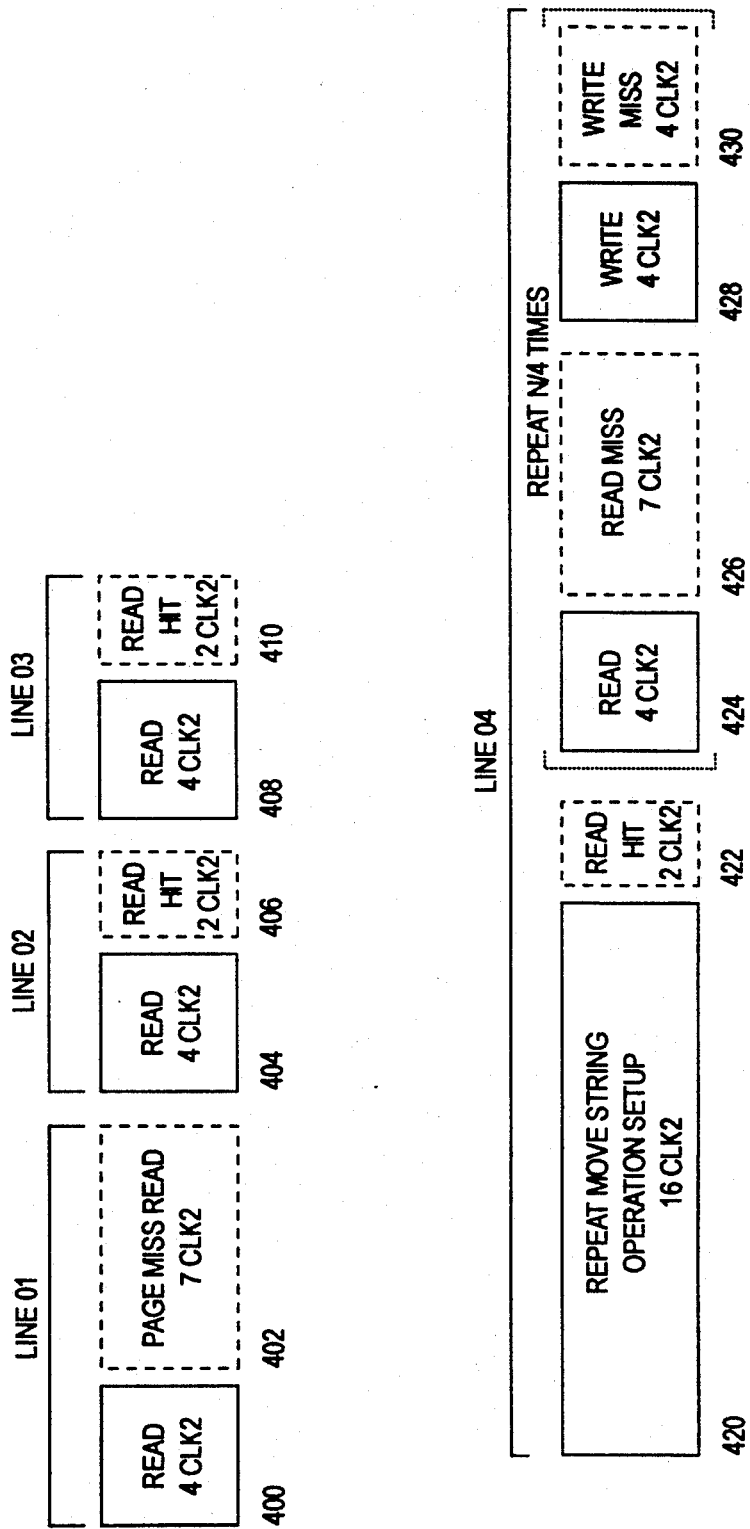
FIGS. 3A and 3B are instruction timing diagrams illustrating the operation of the present invention in comparison to existing buffer copy methods.
Figure 3B:
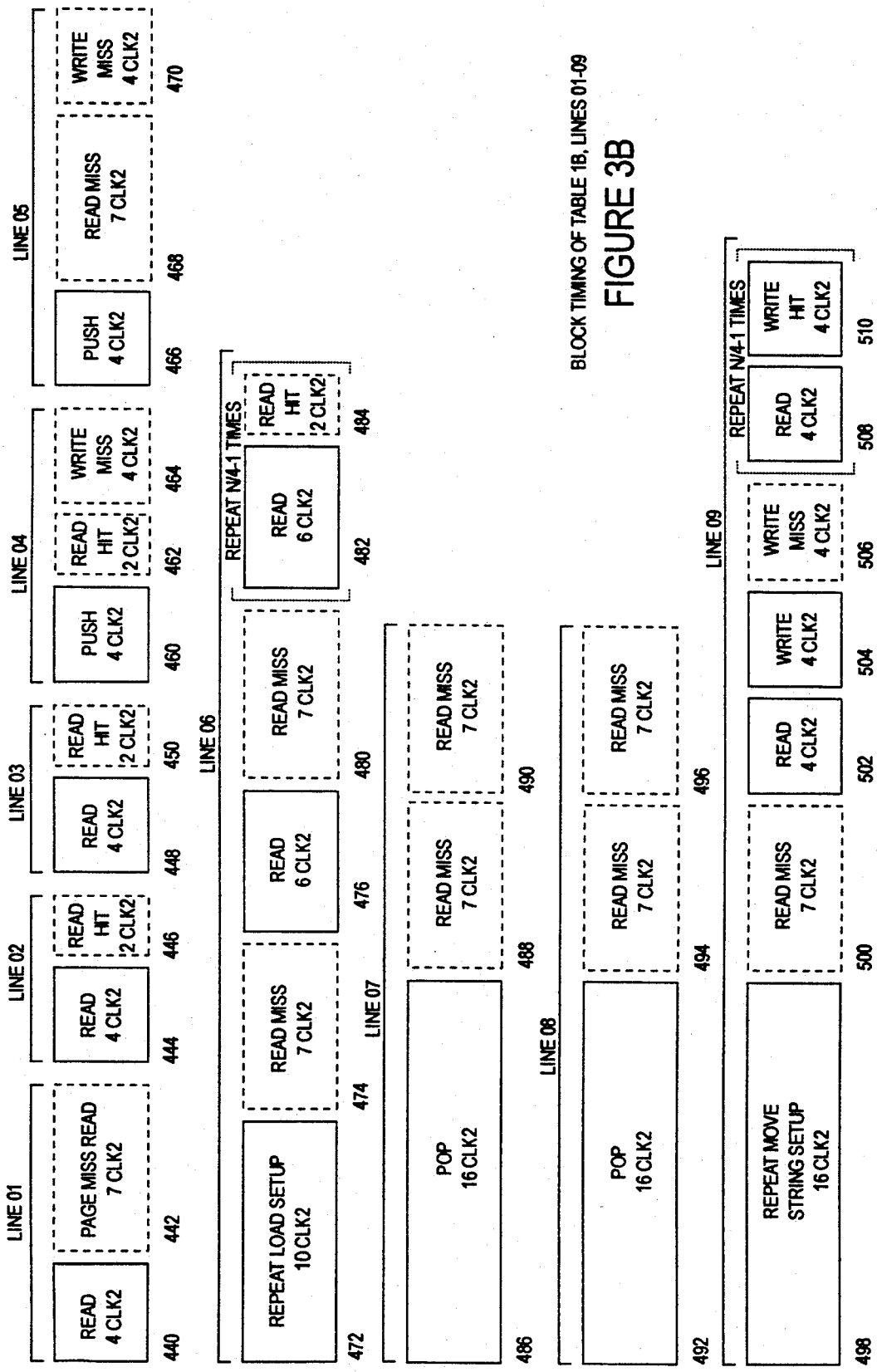

FIGS. 3A and 3B illustrate the implementation of the method of the present invention on a computer system having an improved page memory controller 62 as disclosed in U.S. patent application No. 431,670, filed Jan. 2, 1990 and assigned to Compaq Computer Corporation, assignee of the present invention. Specifically, the computer system disclosed therein is an EISA-based computer system having a 33 MHz 80386 microprocessor 20 coupled to an 82385 cache controller 24 as shown in FIGS. 1, 2A and 2B. The computer system utilizes paged mode memory 58 devices and performs page hit detection on the local processor bus as shown in FIG. 1. Column address and data values are latched by the memory controller 62 on write operations to allow early completion of a cycle so that the next cycle may partially overlap. The design of the system allows for zero wait state page hit write operations, two wait state read page hit operations, four wait state write page miss operations and seven wait state read page miss operations. It should be understood that the wait states as set forth in FIGS. 3A and 3B are specifically associated with the computer system of the type disclosed in U.S. application No. 431,670. Other computer configurations may result in differing wait states for the various operations performed. The times actually spent performing the operations were derived from published Intel information on the 80386 microprocessor.

The computer system has at least two clocks which are used in the operation of the system. The CLK1 signal is the nominal processor speed, in this instance, 33 MHz. Microprocessor 20 operations are measured in CLK1 cycles. The other clock of interest is the CLK2 signal, which in the above computer system runs at 66 MHz and is the actual clock signal applied to the microprocessor 20 in the case of an 80386. Thus, two CLK2 signal cycles are equivalent in time to one CLK1 signal cycle. In order to more easily illustrate the relative timing in FIGS. 3A and 3B, all operations are measured in CLK2 cycles. Thus, an operation normally requiring 2 CLK1 cycles to complete is depicted as requiring 4 CLK2 cycles to complete. Further, a wait state, as mentioned, above is equivalent to a single CLK2 cycle as the CLK2 signal is the basic clock signal used by the memory controller 62 to advance operations. It is noted that the timings may be somewhat simplified as the prefetch capabilities of the 80386 microprocessor 20 are ignored, but this simplification is believed to better illustrate operation of the present invention. The effects of the prefetch capabilities on the exact timing sequences will be understood and recognized by those skilled in the art.

Referring to FIG. 3A, blocks 400 and 402 represent the amount of time required to perform the MOV instruction in Table 1A, line 01. The MOV instruction loads the address of the source buffer $B_s$ into a register. The source buffer $B_s$ 205 is depicted as being located on memory page Z 204 in the exemplary memory map of FIG. 4. The MOV instruction is essentially a read operation 400 and requires 2 CLK1 or 4 CLK2 periods. The time required for each of the instructions listed below may be found in the Intel Reference Manual, within the 80386 specification. The wait states associated with the illustrative embodiment are set forth above. It is assumed in FIG. 3A that the memory controller 62 is pointing at a memory 58 location on another page of memory 58. Accordingly, the READ operation 400 incurs a PAGE MISS READ penalty 402 of 7 wait states or 7 CLK2 periods. Blocks 404 and 406 represent the read operation and wait states of the second MOV instruction listed in Table 1A, line 02, which loads the address of the target buffer $B_t$, or the buffer into which the source buffer $B_s$ contents are to be copied into a microprocessor 20 register. The target buffer $B_t$ 203 is depicted as being located on memory page Y 202 in the exemplary map of FIG. 4. READ operation 404 requires 4 CLK2 cycles. However, the READ 404 is probably directed to the same memory 58 page where instructions are located. Thus, the penalty 406 of 2 CLK2 periods is significantly shorter than the 7 CLK2 periods which accompany the PAGE MISS READ penalty 402. Similarly, blocks 408/410 represent the time required to perform instruction line 03 in Table 1A. In blocks 408 and 410 the number of transfers from the source buffer $B_s$ is loaded into a register (Table 1A, line 03). The computer used in the preferred embodiment is capable of a transfer width of 32 bits per transfer. Accordingly, the number of transfers to be made is equal to the total number of bytes to be transferred, divided by four.

Blocks 420 through 430 represent the activity carried out by the REP MOVSD instruction (Table 1A, line 04). This sequence of blocks actually performs the copying of information from the source buffer $B_s$ to the target buffer $B_t$. Block 420 represents the time required for the microprocessor 20 to setup what is essentially a looping function, which will continue to perform the string operation which follows the number of times which has been specified in Table 1A, line 03 (BUF-F_SIZE/4). The read and setup operation block 420 will also incur a READ PAGE HIT 422 penalty of 2 CLK2 signal cycles because of the need to read the instruction from memory 58. Blocks 424 through 430 represent the looping operation which copies the source buffer contents. The block READ operation 424 reads four bytes at a time from the source buffer $B_s$. This operation requires 4 CLK2 cycles. Assuming that the source buffer $B_s$ is not on the same page as the MOVSD instruction, a READ PAGE MISs penalty 426 of 7 CLK2 cycles is incurred with each read, Upon reading he four bytes, the bytes are written in a WRITE operation 428 to the target buffer $B_t$. The target buffer $B_t$ is presumed to be on a different memory 58 page. Accordingly, the WRITE operation 428 will incur a WRITE PAE MISS penalty 430 of 4 CLK2 cycles. Operations then loop back to block 424 for the next read operation. Since the source buffer $B_s$ is on another memory 58 page from the target buffer $B_t$, the memory controller 62 must index to the proper memory 58 page for the next READ operation 424. Thus, a READ PAGE MISS penalty 426 will result. Similarly, every WRITE operation 428 will be accompanied by a WRITE PAGE MISS penalty 430. The information within the source buffer $B_s$ is copied four bytes at a time until all bytes have been transferred. This completes the normal buffer copy operation method generally used in a personal computers.

The instruction time representation of the method of the present invention as set forth in Table 1B is illustrated in FIG. 3B. Blocks 440-450 in FIG. 3B are identical in function and timing to blocks 400-410 in FIG. 3A. As may be seen from Table 1A, lines 01-03 and Table 1B, lines 01-03, the commands used in the two methods are identical. Referring now to FIG. 3B, block 460 corresponds to he firs PUSH instruction i Table 1B, line 04. The PUSH operation 460 saves the source buffer address by writing or pushing it into a memory 58 stack. The stack 201 is depicted as being located on page X 200 in the exemplary memory map of FIG. 4. The reading of the PUSH instruction incurs a READ PAGE HIT 462 penalty of 2 CLK2 cycles. The writing of the address to memory 58 includes a WRITE PAGE MISS penalty because the stack is assumed to be at a different memory page from the instruction. This is shown as block 464. The second PUSH operation 466 saves the number of transfers to be made (BUFF_SIZE/4) by writing the number to a memory 58 stack. The second PUSH operation 466 requires four CLK2 cycles to complete. As the memory controller 62 was pointing to the location of the memory 58 stack, the PUSH operation 466 will incur a READ PAGE MISS 468 of 7 CLK2 cycles when retrieving the instruction. As with PUSH operation 460, PUSH operation 466 incurs a WRITE MISS PENALTY 470 of 4 CLK2 cycles when the data is actually pushed onto the stack. It is understood by one skilled in the art that the address of the source buffer $B_s$ and the number of transfers to be made (BUFF_SIZE/4) may alternatively be stored in other general purpose registers within the 80386 microprocessor.

Blocks 472 through 484 correspond to the REP LODSD command (Table 1B, line 08). The REP LODSD instruction directs the microprocessor 20 to load a four byte character string from the address specified (see Table 1B, line 01) into a register, increment the address by four bytes and to continue to perform the operation n times where n is the value stored in the CX register (Table 1B, line 03), in this instance, BUFF_SIZE/4 times. As in the normal method of buffer copy operations with the present computer, the data transport takes place 4 bytes or 32 bits at a time. The setup operation 472 is a fixed block which represents the time required by the microprocessor 20 to prepare to carry out the LODSD string instruction and requires 10 CLK2 cycles. A READ PAGE MISS 474 penalty is incurred in reading the REP LODSD instruction as the memory controller 62 was pointing to the location of the memory 58 stack. The first READ operation 476 instructs the processor 20 to read the first 4 bytes of the source buffer $B_s$ and requires 6 CLK2 cycles. The READ operation 476 loads the first 4 bytes into a register and microprocessor 20. Because the memory controller 62 is currently pointing to the memory 58 address wherein the instructions are stored, read 476 incurs a READ PAGE MISS 480 penalty of 7 CLK2 cycles. As the read operation 476 is performed, the cache controller 24 simultaneously loads the 4 bytes into cache memory 28 without incurring any additional processor time. The processor 20 is then directed to perform steps 482 and 484, a total of (BUFF_SIZE/4-1) times. The READ operation 482 will read the next 4 bytes from the source buffer $B_s$ and load them into the register in the microprocessor 20, effectively overwriting the contents of the register. As the memory controller 62 is already pointing to the page on which the source buffer $B_s$ is located, READ operation 482 will incur a READ PAGE HIT 484 penalty of 2 CLK2 cycles. The microprocessor 20 will continue to read the next four bytes of the source buffer $B_s$ and overwrite the contents of the register, effectively loading the entire contents of the source buffer $B_s$ into cache memory 28.

The POP operation 486 corresponds to the instruction listed in Table 1B, line 07. The POP operation 486 requires 16 CLK2 cycles to perform and will incur a READ PAGE MISS 488 penalty of 7 CLK2 cycles, as the memory controller 62 is pointing to the memory 58 page on which the source buffer $B_s$ is located. The POP operation 486 will also incur a READ PAGE MISS 490 penalty of 7 CLK2 cycles when it restores the number of times the operation must be performed. The second POP operation 492 also requires 16 CLK2 cycles and will restore the location of the source buffer $B_s$. Because the memory controller 62 is currently directed to the memory 58 page on which the stack is located, a READ PAGE MISS 494 penalty of 7 CLK2 cycles will be incurred by POP operation 482 as the memory controller 62 must be directed to the memory 58 page on which the instructions are stored. As with POP operation 486, POP operation 492 will incur a READ PAGE MISS 496 penalty of 7 CLK2 cycles in reading the data from the stack. As stated above, the source buffer address $B_s$ and the number of transfers to be made could be stored in general purpose registers and retrieved in a like manner.

The REP MOVSD instruction appearing on Table 1B, line 11 is represented by instruction blocks 498 through 512. The microprocessor 20 must be set up to perform the looping string operation. The move string setup and other overhead 498 requires 16 CLK2 cycles to perform. Because the memory controller 62 is directed to the memory page on which the stack is located, the move string setup incurs a READ PAGE MISS 500 penalty of 7 CLK2 cycles. The microprocessor 20 is then instructed to read the first four bytes of the source buffer $B_s$ and write the four bytes to the source buffer $B_t$. The read operation 502 corresponds to the reading of the first four bytes. However, the cache controller 24 will recognize that the contents of the desired memory 58 address are in cache memory 28. Therefore, the memory controller 62 will not be directed to the memory 58 page on which the source buffer $B_s$ is located as the READ will take place from cache memory 28. The READ operation 502 requires 4 CLK2 cycles and takes place directly from cache memory 28. Accordingly, no read penalty is associated with the read from cache memory 28. The microprocessor 20 then performs the WRITE operation 504 and writes the first four bytes of the source buffer from cache memory 28 to the target buffer $B_t$. The WRITE operation 504 requires 4 CLK2 cycles and incurs a WRITE PAGE MISS 506 penalty of 4 CLK2 cycles, as the memory controller 62 must be directed to the page on which the target buffer $B_t$ is located. The microprocessor 20 then performs steps 510 through 512 until the entire content of the source 27 buffer $B_s$ has been written from cache memory 28 to the source buffer $B_t$. The read operation 510 requires 4 CLK2 cycles and represents a read directly from cache memory 28. The write operation 512 also requires 4 CLK2 cycles to perform and incurs no page write penalties as the memory controller 62 is already directed to the memory 58 page on which the target buffer $B_t$ is located. Accordingly, the microprocessor 20 will continue to perform steps 510 and 512 without incurring any wait state penalties. Steps 510 and 512 are repeated a total of BUFF_SIZE/4-1 times until the entire contents of the source buffer $B_s$ are written to the target buffer $B_t$. This completes the movement of the data from source buffer $B_s$ to target buffer $B_t$.

It may be readily seen from Tables 1A and 1B and FIGS. 3A and 3B that many of the commands normally used to carry out buffer copy operations are used in the present invention. Further, it is apparent that the present invention requires additional steps to carry out buffer copy operations. After eliminating common operations 400 through 410 for the normal method of operation and operations 440 through 450 of the method of the present invention, one may determine the differential time required to perform buffer copy operations by the normal method and the method of the present invention.

The total time required to perform buffer copy operations by the normal method, less any common operations, is represented by equation 1 below:

$$T1 = 18 + 19n/4 \qquad (1)$$

Where n is the number of bytes to be transferred.

The time required to perform buffer copy operations by the method of the present invention, less any common operations, is represented in equation 2 below:

$$T2 = 150 + 16(n/4 - 1) \qquad (2)$$

Again, n represents the total number of bytes to be transferred.

By setting Equation 1 equal to Equation 2, one may determine the breakeven point after which the method of the present invention become advantageous for buffer copy operations.

$$18 + 19n/4 = 150 + 16(n/4 - 1) \qquad (3)$$

$$18 + 19n/4 = 134 + 16n/4$$

$$3n/4 = 116$$

$$n = 154.67$$

Accordingly, the method of the present invention is advantageous wherein there are at least 155 bytes which must be copied from the source buffer $B_s$ to the target buffer $B_t$. As most buffer copy transfers take that the method of the present invention will be advantageous for all buffer copy operations. It should be noted that the above breakeven point is particular to the computer system used to illustrate the method of the present invention and is based on particular instruction times, instructions available, and read and write page hit and miss times, but it is clear that the breakeven point will exist for the various other computer systems. For example, if MOV DI, OFFSET DESTBUFF instruction of step 02 was replaced by a MOV DI, SI instruction, the REP LODSD instruction of Table 1B, line 08 was replaced by a REP MOVSD of the source buffer to the source buffer and the MOV DI, OFFSET DESTBUFF instruction was added between lines 08 and 09, the breakeven count using the illustrative computer system would be 596.

$$N = \frac{(200 + 32B + 12 - 4A - 4C)}{(B + D - A - C - 6)} \qquad \text{Equation 4:}$$

The break even count may also be expressed in general terms for an 80386 computer system having differing page HIT/MISS READ and WRITE penalties. In equation 4, A represents a PAGE HIT READ penalty, B represents a PAGE MISS READ penalty, C represents a PAGE HIT WRITE penalty, and D represents a PAGE MISS WRITE penalty, all penalties being in CLK2 counts. It should be noted that the exemplary computer system set forth above incurred zero wait states when a PAGE HIT WRITE occurred. However, in the general case, a PAGE HIT WRITE must be considered. Accordingly, a PAGE HIT WRITE block would follow WRITE operation 512 in FIG. 3B.

The foregoing disclosure and description of the invention are illustrative and explanatory thereof, and various changes in the size, shape, materials, components, circuit elements, wiring connections and contacts, as well as in the details of the illustrated circuitry and construction may be made without departing from the spirit of the invention.

I claim:

1. In a computer system having a microprocessor having a plurality of registers, main memory utilizing paged mode memory devices, a memory controller, a cache memory and a cache memory controller, an improved method for copying information from a first buffer beginning at a first address in main memory, the first buffer having a size less than that of the cache memory, to a second buffer beginning at a second address in main memory, the steps comprising:
   (a) reading n bytes from the first buffer, where n is a word width;
   (b) writing said n bytes to a location which does not result in a page miss of the paged mode memory devices and simultaneously writing said n bytes into the cache memory;
   (c) performing steps (a) through (b) as a series of page hit read operations of the paged mode memory devices until the contents of the first buffer have been loaded into cache memory;
   (d) reading n bytes of the first buffer from the cache memory;
   (e) writing said n bytes to the second buffer address; and
   (f) performing steps (d) through (e) as a series of cache read hits and page write hits to the paged mode memory devices until the contents of the first buffer have been written from the cache memory to the second buffer.

2. The method of claim 1, wherein the operation of writing said n bytes to a location not resulting in a page miss of the paged mode memory devices includes writing said n bytes to a register in the microprocessor.

3. The method of claim 2, further including performing the following steps prior to step (a):
   storing the beginning memory address of the first buffer;
   determining the required number of read operations to read the first buffer n bytes at a time; and
   storing the required number of read operations to be performed.

4. The method of claim 3, wherein steps (a) through (c) further include:
   reading a bytes from the firs buffer from a current first buffer address;
   writing said n bytes into the register in the microprocessor, overwriting any prior contents of the register and simultaneously writing said n bytes into the cache memory at an address corresponding to the current first buffer address;
   determining if the required number of read operations have been performed;
   incrementing the current first buffer address by n bytes and decrementing the required number of read operations to be performed when the required number of read operations have not been completed; and
   performing the above steps until the required number of read operations has been performed.

5. The method of claim 4, further including the step of resetting the first buffer address to the beginning first address after step (c) and prior to step (d) and wherein the steps (e) through (g) further include:
   reading n bytes of the first buffer from a cache memory address corresponding to the current first buffer address;
   wiring said n bytes to a current second buffer address;
   determining if the required number operations have been performed;
   incrementing the current first buffer address and the current second buffer address by n bytes and decrementing the required number of read operations to be performed when the required number of read operations have not been performed; and
   performing the above steps until the required number of read operations have been performed.

6. The method of claim 4, further including performing the following steps prior to step (e):
   reading the first buffer beginning address; and
   reading the required number of read operations to be performed.

7. The method of claim 1, wherein writing said n bytes to a location which does not result in a page miss of the paged mode memory devices includes writing back to the first buffer address from which said n bytes were read.

* * * * *